(12) United States Patent
Soo et al.

(10) Patent No.: US 12,452,223 B2
(45) Date of Patent: Oct. 21, 2025

(54) SYSTEMS AND METHODS FOR COMMUNICATING ENCRYPTED TIME-RELATED DATA

(71) Applicant: Intel Corporation, Santa Clara, CA (US)

(72) Inventors: Choon Yip Soo, Bayan Lepas (MY); Su Wei Lim, Bayan Lepas (MY); Si Xing Saw, Bukit Mertajam (MY); Markos Papadonikolakis, London (GB)

(73) Assignee: Altera Corporation, San Jose, CA (US)

( * ) Notice: Subject to any disclaimer, the term of this patent is extended or adjusted under 35 U.S.C. 154(b) by 791 days.

(21) Appl. No.: 17/559,875

(22) Filed: Dec. 22, 2021

(65) Prior Publication Data
US 2022/0116373 A1    Apr. 14, 2022

(51) Int. Cl.
*H04L 9/40*    (2022.01)
(52) U.S. Cl.
CPC ........ *H04L 63/068* (2013.01); *H04L 63/0428* (2013.01); *H04L 63/108* (2013.01)
(58) Field of Classification Search
CPC . H04L 63/108; H04L 63/068; H04L 63/0428; H04L 63/162; H04L 2463/121; G06F 21/725; G06F 2221/2151; H04J 3/0667
USPC .......................................................... 380/273
See application file for complete search history.

(56) References Cited

U.S. PATENT DOCUMENTS

| | | | |
|---|---|---|---|
| 7,706,538 B1* | 4/2010 | Hughes | H04L 9/00 380/269 |
| 9,705,619 B2* | 7/2017 | House | H04J 3/0605 |
| 9,954,982 B2* | 4/2018 | Lin | H04L 69/22 |
| 10,397,194 B2* | 8/2019 | Dides | H04L 63/06 |
| 10,567,957 B1* | 2/2020 | Ingale | H04L 5/0048 |
| 10,833,679 B2 | 11/2020 | Clark et al. | |
| 11,165,527 B2* | 11/2021 | Johnson | H04J 3/0661 |
| 11,936,635 B2* | 3/2024 | Hu | H04L 63/0485 |
| 2016/0049941 A1 | 2/2016 | How et al. | |
| 2017/0026349 A1* | 1/2017 | Smith | H04L 45/38 |

OTHER PUBLICATIONS

"Altera 1588 System Solution," Jan. 28, 2016, 45 pages, Intel Corporation.
Baker et al. "Intel® Agilex™ FPGAs for IPUs and SmartNICs, and 5G Networks," May 15, 2021, 4 pages, Intel Corporation.

* cited by examiner

*Primary Examiner* — Amare F Tabor
(74) *Attorney, Agent, or Firm* — Fletcher Yoder, P.C.

(57) ABSTRACT

An integrated circuit device includes encryption circuitry to encrypt a data packet and scheduler circuitry to receive the encrypted data packet from the encryption circuitry. The scheduler circuitry monitors a duration of time associated with egress of the encrypted data packet, holds the encrypted data packet until the duration of time matches a threshold duration of time, and transmits the encrypted data packet in response to the duration of time matching the threshold duration of time.

20 Claims, 8 Drawing Sheets

SYSTEMS AND METHODS FOR COMMUNICATING ENCRYPTED TIME-RELATED DATA

BACKGROUND

The present disclosure relates generally to data communication. Specifically, deterministic latency is implemented for communicating encrypted data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits are found in numerous electronic devices, from handheld devices, computers, gaming systems, robotic devices, automobiles, and more. These integrated circuits are often disposed on silicon die or chips that communicate with each other. In some embodiments, data or messages that are transmitted between components of integrated circuits may be encrypted. For example, data encryption may block data from being changed during communication, such as by a third party, and may therefore facilitate desirable receipt of the data by a target recipient and subsequent action performed by the target recipient. Unfortunately, data encryption may introduce variable latency with respect to transmission of the data and may affect a timing associated with data communication and subsequent operation.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
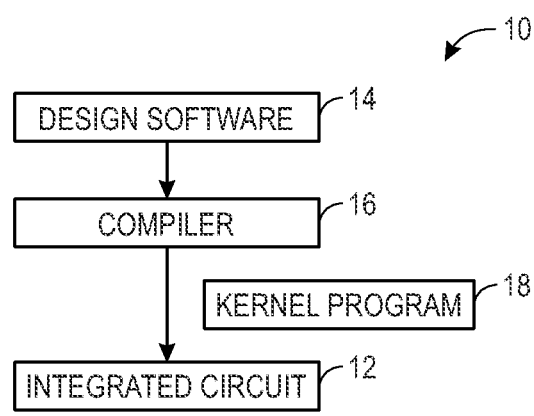
FIG. 1 is a block diagram of a process for programming an integrated circuit including a programmable fabric, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B. Moreover, this disclosure describes various data structures, such as instructions for an instruction set architecture. These are described as having certain domains (e.g., fields) and corresponding numbers of bits. However, it should be understood that these domains and sizes in bits are meant as examples and are not intended to be exclusive. Indeed, the data structures (e.g., instructions) of this disclosure may take any suitable form.

The present systems and techniques relate to embodiments for communicating data. For example, an integrated circuit may include circuitry that may transmit data to and/or receive data from another component, such as circuitry of a separate integrated circuit. In some embodiments, an initiator from which the data is transmitted may encrypt the data prior to transmission toward a target recipient in order to protect an integrity of the data. For example, the encryption process may block undesirable changes or adjustments made to the encrypted data during transmission. The target recipient may receive the encrypted data, decrypt the encrypted data, and process the decrypted data to perform a subsequent operation or action.

In some circumstances, it may be desirable to communicate data in accordance with a desirable latency to enable a precise timing of operation between components. To this end, it may be desirable to determine various latencies associated with transmission of the data via the initiator toward the target recipient, such as a latency caused by generation of the data by the initiator, processing of the data within the circuitry of the initiator, and subsequent transmission external to the initiator. However, encryption of data may vary the latency and reduce the ability to determine latencies. For example, an amount of time used by encryption logic to perform the encryption process may vary for different data being transmitted. That is, a duration of time associated with initiation of the encryption process and subsequent transmission of the encrypted data may vary and introduce a variable latency that cannot be easily determined. As a result, the encryption process may affect timing of the receipt of encrypted data and corresponding operation based on processing of the data.

Thus, it is presently recognized that mitigating the variable latency introduced by the encryption process may improve operation related to data communication. Accordingly, embodiments of the present disclosure are directed to implementation of scheduler logic in the initiator to hold data being transmitted. For example, the scheduler logic may receive encrypted data from the encryption logic after the encryption process. The scheduler logic may hold the encrypted data until a duration of time since receipt of the data at the encryption logic reaches a threshold duration of time, upon which the scheduler logic may transmit the encrypted data to a downstream component of the initiator. The threshold duration of time may be a fixed and predetermined or known threshold time such that the duration of time associated with receipt of the data by the encryption logic and subsequent transmission of the encrypted data by the initiator is fixed. That is, the scheduler logic may implement a deterministic or fixed latency related to transmission of the data via the initiator toward the target recipient regardless of the amount of time used to perform the encryption process. As such, the scheduler logic may improve a timing associated with data communication between components and corresponding operation based on the data.

With the foregoing in mind, FIG. 1 illustrates a block diagram of a system 10 used to configure a programmable device. A designer may implement functionality on an integrated circuit, such as an integrated circuit 12 that includes some reconfigurable circuitry, such as an FPGA. A designer may implement a circuit design to be programmed onto the integrated circuit 12 using design software 14, such as a version of Quartus by Intel™. The design software 14 may use a compiler 16 to generate a low-level circuit-design, which may be provided as a kernel program 18, sometimes known as a program object file or bitstream, that programs the integrated circuit 12. That is, the compiler 16 may provide machine-readable instructions representative of the circuit design to the integrated circuit 12.

Figure 2:
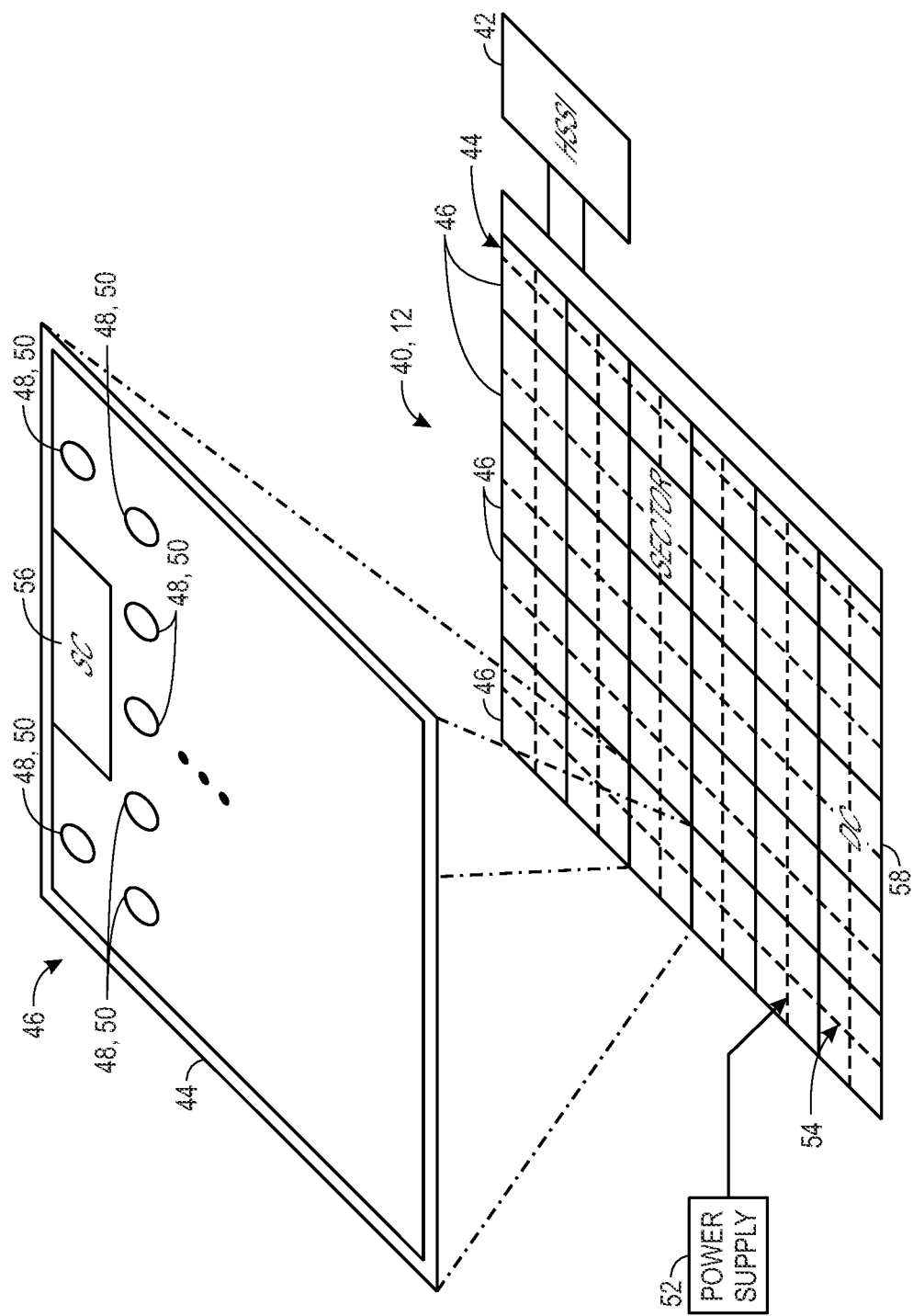
FIG. 2 is a diagram of the programmable fabric of FIG. 1, in accordance with an embodiment.

The integrated circuit 12 may include any programmable logic device, such as a field programmable gate array (FPGA) 40, as shown in FIG. 2. For the purposes of this example, the FPGA 40 is referred to as an FPGA, though it should be understood that the device may be any suitable type of programmable logic device (e.g., an application-specific integrated circuit (ASIC) and/or application-specific standard product (ASSP)). In one example, the FPGA 40 is a sectorized FPGA of the type described in U.S. Patent Publication No. 2016/0049941, "Programmable Circuit Having Multiple Sectors," which is incorporated by reference in its entirety for all purposes. The FPGA 40 may be formed on a single plane. Additionally or alternatively, the FPGA 40 may be a three-dimensional FPGA having a base die and a fabric die of the type described in U.S. Pat. No. 10,833,679, "Multi-purpose Interface for Configuration Data and User Fabric Data," which is incorporated by reference in its entirety for all purposes.

In the example of FIG. 2, the FPGA 40 may include a transceiver 42 that may include and/or use input-output circuitry for driving signals off the FPGA 40 and for receiving signals from other devices. Interconnection resources 44 may be used to route signals, such as clock or data signals, through the FPGA 40. The FPGA 40 of FIG. 2 is sectorized, meaning that programmable logic resources may be distributed through a number of discrete programmable logic sectors 46. Each programmable logic sector 46 may include a number of programmable logic elements 48 having operations defined by configuration memory 50 (e.g., configuration random access memory (CRAM)). The programmable logic elements 48 may include combinational or sequential logic circuitry. For example, the programmable logic elements 48 may include look-up tables, registers, multiplexers, routing wires, and so forth. A designer may program the programmable logic elements 48 to perform a variety of desired functions. A power supply 52 may provide a source of voltage and current to a power distribution network (PDN) 54 that distributes electrical power to the various components of the FPGA 40. Operating the circuitry of the FPGA 40 causes power to be drawn from the power distribution network 54.

There may be any suitable number of programmable logic sectors 46 on the FPGA 40. Indeed, while 29 programmable logic sectors 46 are shown here, it should be appreciated that more or fewer may appear in an actual implementation (e.g., in some cases, on the order of 50, 100, 500, 1000, 5000, 10,000, 50,000, or 100,000 sectors or more). Each programmable logic sector 46 may include a sector controller (SC) 56 that controls the operation of the programmable logic sector 46. Each sector controller 56 may be in communication with a device controller (DC) 58. Each sector controller 56 may accept commands and data from the device controller 58 and may read data from and write data into its configuration memory 50 based on control signals from the device controller 58. In addition to these operations, the sector controller 56 may be augmented with numerous additional capabilities. For example, such capabilities may include locally sequencing reads and writes to implement error detection and correction on the configuration memory 50 and sequencing test control signals to effect various test modes.

The sector controllers 56 and the device controller 58 may be implemented as state machines and/or processors. For example, each operation of the sector controllers 56 or the device controller 58 may be implemented as a separate routine in a memory containing a control program. This control program memory may be fixed in a read-only memory (ROM) or stored in a writable memory, such as random-access memory (RAM). The ROM may have a size larger than would be used to store only one copy of each routine. This may allow each routine to have multiple variants depending on "modes" into which the local controller may be placed. When the control program memory is implemented as random access memory (RAM), the RAM may be written with new routines to implement new operations and functionality into the programmable logic sectors 46. This may provide usable extensibility in an efficient and easily understood way. This may be useful because new commands could bring about large amounts of local activity within the sector at the expense of only a small amount of communication between the device controller 58 and the sector controllers 56.

Each sector controller 56 may therefore communicate with the device controller 58, which may coordinate the operations of the sector controllers 56 and convey commands initiated from outside the FPGA 40. To support this communication, the interconnection resources 44 may act as a network between the device controller 58 and each sector controller 56. The interconnection resources 44 may support a wide variety of signals between the device controller 58 and each sector controller 56. In one example, these signals may be transmitted as communication packets.

The FPGA 40 may be electrically programmed. With electrical programming arrangements, the programmable elements 48 may include one or more logic elements (wires, gates, registers). For example, during programming, configuration data is loaded into the configuration memory 50 using pins and input/output circuitry. In one example, the configuration memory 50 may be implemented as configuration random-access-memory (CRAM) cells. As discussed below, in some embodiments, the configuration data may be loaded into the FPGA 40 using an update to microcode of the processor in which the FPGA 40 is embedded. The use of configuration memory 50 based on RAM technology described herein is intended to be only one example. Moreover, configuration memory 50 may be distributed (e.g., as RAM cells) throughout the various programmable logic sectors 46 of the FPGA 40. The configuration memory 50 may provide a corresponding static control output signal that controls the state of an associated programmable logic element 48 or programmable component of the interconnection resources 44. The output signals of the configuration memory 50 may be applied to the gates of metal-oxide-semiconductor (MOS) transistors that control the states of the programmable logic elements 48 or programmable components of the interconnection resources 44.

The sector controllers 56 and/or the device controller 58 may determine when each sector controller 56 performs a CRAM read operation on the configuration memory 50 of its programmable logic sector 46. Each time the sector controller 56 performs a CRAM read of the configuration memory 50, power is drawn from the power distribution network 54. If too much power is drawn from the power distribution network 54 at any one time, the voltage provided by the power distribution network 54 could drop to an unacceptably low level, or too much noise could arise on the power distribution network 54. To avoid this, the device controller 58 and/or the sector controllers 56 may structure CRAM reads of the programmable logic sectors 46 to avoid excessive instantaneous power consumption by temporally and/or spatially distributing the CRAM reads across different programmable logic sectors 46.

The sector controller 56 of the programmable logic sector 46 is shown to read and write to the configuration memory 50 by providing an ADDRESS signal to an address register and providing a memory write signal (WRITE), a memory read signal (RD DATA), and/or the data to be written (WR DATA) to a data register. These signals may be used to cause the data register to write data to or read data from a line of configuration memory 50 that has been activated along an address line, as provided by the ADDRESS signal applied to the address register. Memory read/write circuitry may be used to write data into the activated configuration memory 50 cells when the data register is writing data and may be used to sense and read data from the activated configuration memory 50 cells when the data register is reading data.

Figure 3:
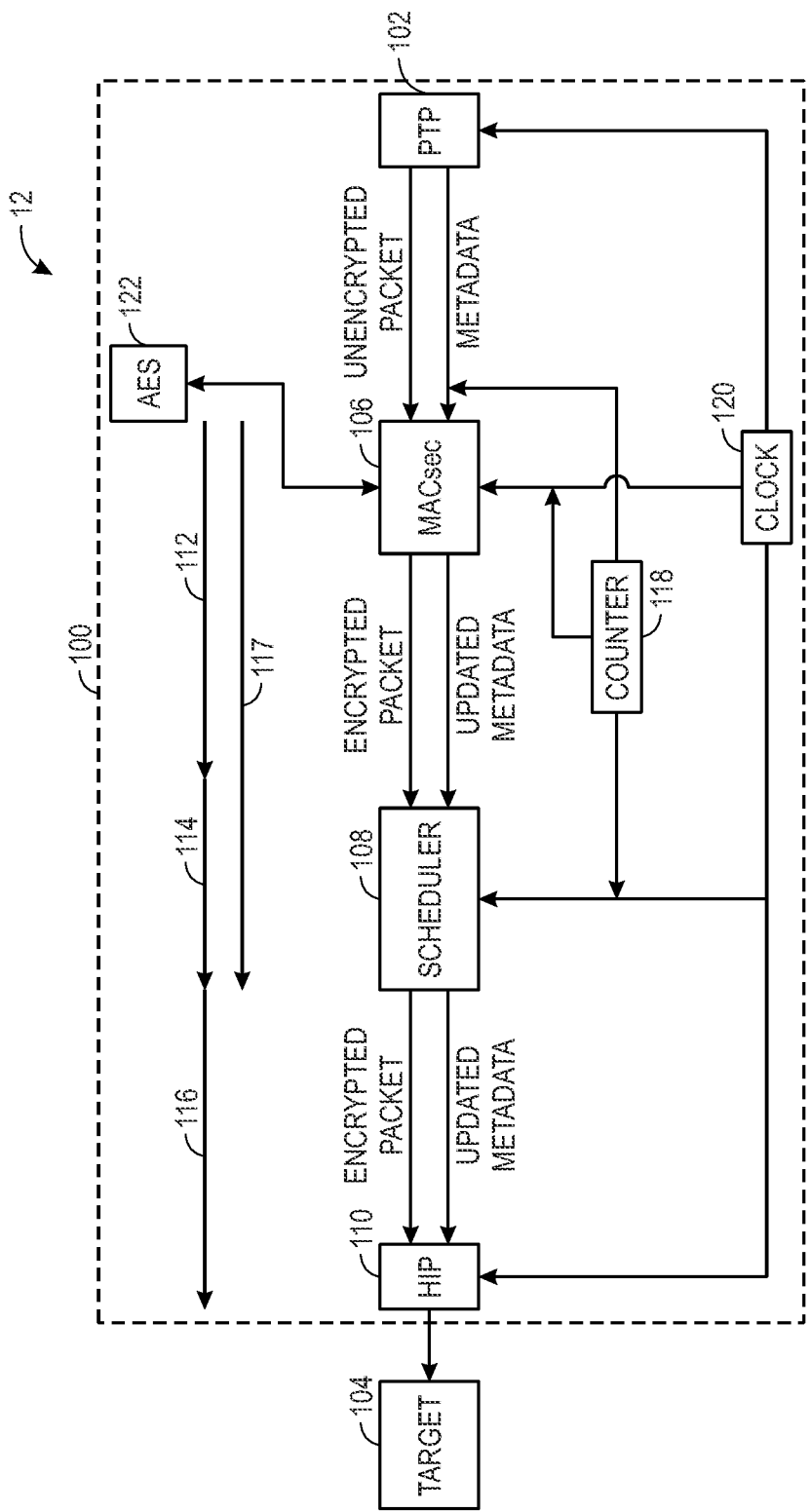
FIG. 3 is a diagram of circuitry that may be employed in the programmable fabric of FIG. 1 to transmit data, in accordance with an embodiment.

FIG. 3 is a block diagram of an embodiment of a system 100 that may be employed by the integrated circuit 12. For example, the system 100 may include circuitry incorporated in an FPGA (e.g., the FPGA 40) and/or an ASIC. The system 100 may perform a time-critical protocol or process, such as Precision Time Protocol (PTP), which may include PTP 1588. For example, the system 100 may include PTP logic or circuitry 102, and the integrated circuit 12 may serve as an initiator in which the PTP logic 102 transmits a packet (e.g., a data packet, a communication packet) for eventual receipt by a target recipient 104, such as a circuit separate from the integrated circuit 12. In some embodiments, the integrated circuit 12 may generate the packet for transmission to the target recipient 104. In additional or alternative embodiments, the integrated circuit 12 may initially receive the packet from another initiator and may forward the packet to the target recipient 104 after receipt of the packet.

The packet may include an Ethernet packet with time synchronization messages to synchronize time between the integrated circuit 12 and the target recipient 104. For instance, the PTP logic 102 and therefore the integrated circuit 12 may transmit a timestamp indicative of a grand master time to which the target recipient 104 may reference for synchronization. In this way, the integrated circuit 12 may serve as a primary clock or reference clock, and the target recipient 104 may serve as a client clock or member clock. Upon synchronizing times, the integrated circuit 12 and the target recipient 104 may operate in accordance with approximately the same reference clock (e.g., within less than one microsecond of the same reference clock), such as the same grand master clock. As a result, respective operation of the integrated circuit 12 and the target recipient 104 may be synchronized and performed within a desirable precision of timing.

In certain embodiments, the system 100 may include a media access control security (MACsec) logic or circuitry 106 that may receive the packet transmitted by the PTP logic 102. The MACsec logic 106 may encrypt or encode an unencrypted packet received from the PTP logic 102. For example, the MACsec logic 106 may use a security association key (SAK) to encrypt the packet. After encrypting the packet, the MACsec logic 106 may transmit the encrypted packet to scheduler logic or circuitry 108. As further described herein, the scheduler logic 108 may hold the encrypted packet for a duration of time before transmitting the encrypted packet to hard or processing cores intellectual property (HIP) 110 of the system 100, such as media access control (MAC), physical coding sublayer (PCS), physical medium attachment (PMA) sublayer, and the like. The HIP 110 may process the encrypted packet for transmission to the target recipient 104.

In some embodiments, such as during one-step operation mode of PTP, the PTP logic 102 may also transmit a timestamp with the packet. The timestamp (e.g., an egress timestamp) may indicate when the integrated circuit 12 (e.g., the HIP 110) transmits the encrypted packet to the target recipient 104 (e.g., when the encrypted packet leaves the integrated circuit 12). To this end, the PTP logic 102 may factor in a latency associated with transmission of the packet through the system 100 before eventual transmission from the integrated circuit 12 toward the target recipient 104. The PTP logic 102 may transmit metadata that includes the timestamp in parallel with the packet. The metadata may also be used by the scheduler logic 108 to determine for how long the scheduler logic 108 is to hold the encrypted packet before transmitting the encrypted packet to the HIP 110. As an example, the metadata may also indicate an elapsed time since performance of certain processes. For instance, the MACsec logic 106 may receive the metadata and may update the metadata to indicate a time (e.g., an additional timestamp separate from the timestamp indicated by the PTP logic 102) of receipt of the packet at the MACsec logic 106. The MACsec logic 106 may not encrypt at least a portion of the metadata to enable the scheduler logic 108 to read and process updated metadata (e.g., that includes the time indicated by the MACsec logic 106). By way of example, the scheduler logic 108 may receive the encrypted packet and the updated metadata, hold the encrypted packet for a duration of time based on the updated metadata, and transmit the encrypted packet and the updated metadata to the HIP 110 after the duration of time has elapsed.

After the packet and its accompanying timestamp have been encrypted, the timestamp may no longer be modified (e.g., updated to account for a duration of time used to encrypt the packet via the MACsec logic 106 and more accurately represent when the integrated circuit 12 transmits the packet). Thus, in order to generate an accurate timestamp, the PTP logic 102 may predict, factor in, or consider a total latency associated with receipt of the unencrypted packet from the PTP logic 102, encryption performed by the PTP logic 102, receipt of the encrypted packet at the HIP 110, and transmission of the encrypted packet from the HIP 110 in order to provide a timestamp that accurately represents when the packet is transmitted by the integrated circuit 12. As an example, the PTP logic 102 may provide the timestamp based on a time in which the unencrypted packet is transmitted from the PTP logic 102 and a predicted latency associated with processing the packet from the PTP logic 102 to the HIP 110. However, in some embodiments, a duration of time in which the MACsec logic 106 encrypts the packet may vary based on information associated with the packet, such as based on a timeline associated with the packet and/or data contained within the packet. For example, encrypting a first packet via the MACsec logic 106 may take 10 cycles, and encrypting a second packet via the MACsec logic 106 may take 20 cycles. For this reason, a first duration of time 112 spanning from when the MACsec logic 106 receives the packet from the PTP logic 102 to when the scheduler logic 108 receives the packet from the MACsec logic 106 may be variable.

As such, the scheduler logic 108 may hold the encrypted packet for a second duration of time 114, which may be based on the first duration of time 112. By way of example, the scheduler logic 108 may hold the encrypted packet such that a total or summation 117 of the first duration of time 112 and the second duration of time 114 is equal to a threshold duration of time or threshold value. For instance, in an example embodiment in which the threshold duration of time is equal to 100 cycles, based on the first duration of time 112 being equal to 50 cycles, the scheduler logic 108 may hold the encrypted packet for the second duration of time 114 equal to 50 cycles. Based on the first duration of time 112 being equal to 60 cycles, the scheduler logic 108 may hold the encrypted packet for the second duration of time 114 equal to 40 cycles. Based on the first duration of time 112 being equal to 30 cycles, the scheduler logic 108 may hold the encrypted packet for the second duration of time 114 equal to 70 cycles. In this manner, the total 117 of the first duration of time 112 and the second duration of time 114 may be fixed regardless of the varying first duration of time 112, and the first duration of time 112 and the second duration of time 114 may be inversely proportional to one another. The threshold duration of time may be set at or above a maximum first duration of time 112 to accommodate any possible first duration of time 112 to fix the total 117 of the first duration of time 112 and the second duration of time 114 (e.g., an occurrence in which both the first duration of time 112 and the second duration of time 114 are at respective maximum durations of time). In other words, the scheduler logic 108 may hold the encrypted packet for a duration sufficient to cause each transmission of the encrypted packet to the HIP 110 to occur with a same delay (e.g., a delay equal to or greater than a duration associated with the occurrence in which both the first duration of time 112 and the second duration of time 114 are at respective maximum durations of time).

In certain embodiments, a third duration of time 116 spanning from when the scheduler logic 108 transmits the encrypted packet to the HIP 110 to when the HIP 110 transmits the encrypted packet toward the target recipient 104 may be substantially the same for different packets. Thus, the second duration of time 114 in which the scheduler logic 108 holds the encrypted packet may not be based on the third duration of time 116. However, the timestamp provided by the PTP logic 102 may be based on a total or summation of the first duration of time 112, the second duration of time 114, and the third duration of time 116. The scheduler logic 108 may fix such a total for different packets being transmitted to the target recipient 104 to enable the timestamp provided by the PTP logic 102 to accurately represent the time in which a packet is transmitted by the integrated circuit 12 regardless of the varying first duration of time 112. As such, the latency caused by the first duration of time 112, the second duration of time 114, and the third duration of time 116 during data egress may be deterministic or fixed, and the PTP logic 102 may provide a more accurate timestamp with the packet. In other words, the third duration of time 116 may be consistent, and a sum of the first duration of time 112 and the second duration of time 114 may also be consistent to cause a sum of all three durations of time 112, 114, 116 to be consistent across different data packets.

The system 100 may also include a counter 118 to provide information regarding an elapsed time. For example, the counter 118 may provide an elapsed time (e.g., a number of elapsed cycles) to the MACsec logic 106 and/or to the scheduler logic 108. The MACsec logic 106 may use the provided elapsed time to update the metadata. For example, the MACsec logic 106 may update the metadata with an associated initial elapsed time received from the counter 118, and the updated metadata received by the scheduler logic 108 may include the elapsed time provided by the MACsec logic 106. The scheduler logic 108 may hold the packet based on the updated metadata. For instance, upon receipt of the updated metadata and corresponding encrypted packet, the scheduler logic 108 may compare a current elapsed time received from the counter 118 and the elapsed time included in the updated metadata. As an example, the MACsec logic 106 may update the metadata to indicate receipt of the packet at the MACsec logic 106 (e.g., from the PTP logic 102) at 50 cycles (e.g., 50 cycles have elapsed since initiation of the operation of the counter 118). The scheduler logic 108 may receive the packet and the updated metadata from the MACsec logic 106 when the elapsed time provided by the counter 118 is 100 cycles. The scheduler logic 108 may determine a difference between the elapsed time indicated by the updated metadata and the elapsed time provided by the counter 118, or 50 cycles upon receipt of the packet at the scheduler logic 108 in this example.

The scheduler logic 108 may hold the packet based on the elapsed time provided by the counter 118 and the elapsed time indicated in the updated metadata. For example, after a difference between the elapsed time provided by the counter 118 and the elapsed time indicated in the updated metadata matches a threshold duration of time or threshold value (e.g., to indicate that the elapsed time since receipt of the packet at the MACsec logic 106 matches the threshold duration of time), the scheduler logic 108 may transmit the encrypted packet to the HIP 110. Continuing the example above in which the scheduler logic 108 receives the packet when the elapsed time provided by the counter 118 is 100 cycles, the first duration of time 112 is equal to 50 cycles based on the difference between the elapsed time (e.g., 50 cycles) indicated by the updated metadata and the elapsed time provided by the counter 118 upon receipt of the packet at the scheduler logic 108. For the threshold duration of time equal to 100 cycles, the scheduler logic 108 may hold the packet for 50 additional cycles). As such, the scheduler logic 108 may hold the encrypted packet until the elapsed time provided by the counter 118 is equal to 150 cycles in the above example. Similarly, if the first duration of time 112 for another packet is equal to 30 cycles as indicated by the updated metadata and the elapsed time provided by the counter 118, the scheduler logic 108 may hold the encrypted packet for 70 cycles to total the threshold duration of time equal to 100 cycles completed between initiation and transmission to the HIP 110.

Although the present disclosure primarily discusses providing a timestamp based on the latency associated with the total of the first duration of time 112, the second duration of time 114, and the third duration of time 116, the PTP logic 102 may additionally or alternatively provide a timestamp based on other latencies. For example, the system 100 may include an additional component (e.g., additional logic) that may process the packet, and the PTP logic 102 may determine an additional duration of time used for processing the packet via the additional component. In certain embodiments, the additional latency introduced by the additional component may be fixed. In additional or alternative embodiments, the additional latency introduced by the additional component may be variable. In such embodiments, the scheduler logic 108 and/or an additional scheduler may operate using the techniques described herein to mitigate the variable latency to enable the timestamp provided by the PTP logic 102 to accurately represent the time in which the integrated circuit 12 transmits the packet.

Each of the PTP logic 102, the MACsec logic 106, the scheduler logic 108, and the HIP 110 may also reference the same clock 120, such as the same time-of-day (ToD) clock. In this manner, operation of the PTP logic 102, the MACsec logic 106, the scheduler logic 108, and the HIP 110 may be synchronized for more precise timing and avoid clock skew or a difference in reference clock sources between the PTP logic 102, the MACsec logic 106, the scheduler logic 108, and the HIP 110. In some embodiments, the timestamp provided by the PTP logic 102 may be based on the clock 120. Furthermore, the illustrated embodiment includes advanced encryption standard (AES) logic 122 that may be electrically coupled to the MACsec logic 106. The AES logic 122 may also encrypt certain data for transmission via the integrated circuit 12 (e.g., the HIP 110). In certain embodiments, the AES logic 122 may refer to a different clock than the clock 120, such as a clock having a higher clock rate, referred to other components of the system 100 in order to improve performance, such as encryption efficiency and/or time.

Figure 4:
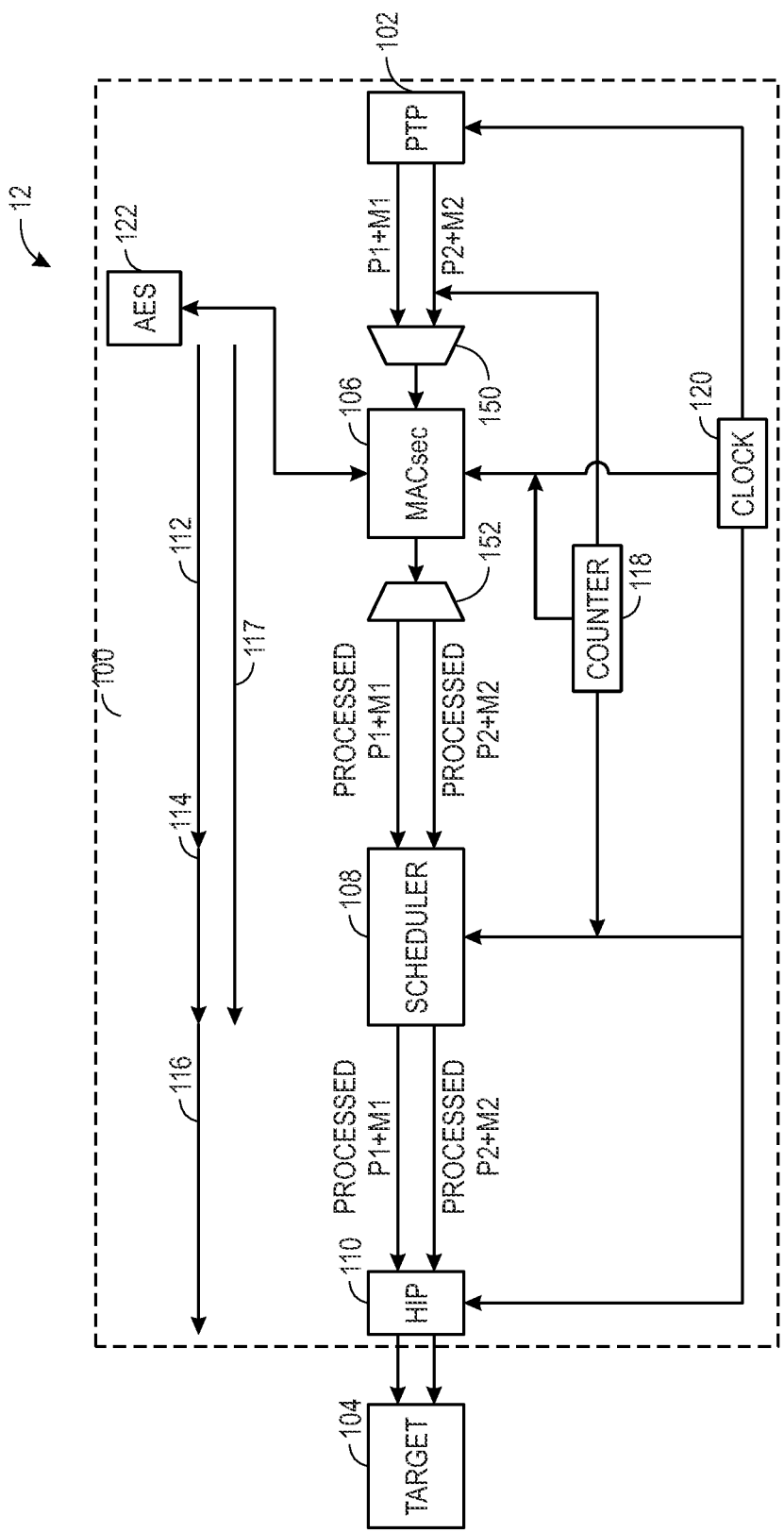
FIG. 4 is a diagram of circuitry that may be employed in the programmable fabric of FIG. 1 to transmit data, in accordance with an embodiment.

FIG. 4 is a block diagram of an embodiment of the system 100 that may be employed by the integrated circuit 12. In the illustrated embodiment, the PTP logic 102 and/or multiple PTP logics may transmit multiple unencrypted packets and metadata to the MACsec logic 106 in parallel with one another. The MACsec logic 106 may include a multiplexer interface 150 having multiple ports that may receive the respective unencrypted packets and the metadata from the PTP logic 102, and the multiplexer interface 150 may select between the respective unencrypted packets and metadata for encryption via the MACsec logic 106 and updating, respectively. After processing the multiplexed packets and metadata, the MACsec logic 106 may demultiplex the processed packets and metadata and transmit the demultiplexed packets and metadata to the scheduler logic 108 and/or multiple scheduler logics, such as via corresponding ports of a demultiplexer interface 152 of the MACsec logic 106. The demultiplexer interface 152 may route the packets and corresponding metadata down respective paths to the scheduler logic 108. The scheduler logic 108 may hold each of the packets until a total 117 of the durations of time (e.g., the first duration of time 112, the second duration of time 114) spanning from when the MACsec logic 106 (e.g., the multiplexer interface 150) receives the packets to when the scheduler logic 108 is to transmit the packets has been reached. When the total 117 of the durations of time reaches the threshold duration of time, the scheduler logic 108 may transmit the packets to the HIP 110 for subsequent transmission to the target recipient 104 and/or to multiple target recipients (e.g., separate target recipients that receive the respective packets).

In some embodiments, each of the packets being transmitted by the integrated circuit 12 may be associated with the same deterministic latency. For example, each packet being transmitted may be associated with a respective first duration of time 112, a respective second duration of time 114, and a respective third duration of time 116. The scheduler logic 108 may hold each of the packets for a respective second duration of time 114 such that the respective total 117 of the first duration of time 112 and the second duration of time 114 may be the same for each packet, even though the first durations of time 112 for different multiplexed packets may vary. By way of example, the threshold duration of time for the total 117 of the first duration of time 112 and the second duration of time 114 may include 100 cycles for each multiplexed packet. The first duration of time 112 associated with a first packet may be 50 cycles, and the scheduler logic 108 may therefore hold the first packet for an additional 50 cycles before transmitting the first packet to the HIP 110. The first duration of time 112 associated with a second packet may be 60 cycles, and the scheduler logic 108 may therefore hold the second packet for an additional 40 cycles before transmitting the second packet to the HIP 110. In such embodiments, the scheduler logic 108 may receive the demultiplexed packets from the MACsec logic 106 at different times, but the scheduler logic 108 may transmit each of the demultiplexed packets to the HIP 110 at approximately the same time.

In additional or alternative embodiments, each of the packets being transmitted may be associated with a different deterministic latency. In an example embodiment, the threshold duration of time for the total 117 of the first duration of time 112 and the second duration of time 114 may include 100 cycles for a first packet and 80 cycles for a second packet. The first duration of time 112 associated with the first packet may be 60 cycles, and the scheduler logic 108 may therefore hold the first packet for 40 cycles before transmitting the first packet to the HIP 110. The first duration of time 112 associated with the second packet may also be 60 cycles, but the scheduler logic 108 may hold the second packet for 20 cycles before transmitting the second packet to the HIP 110. Thus, in such embodiments, the scheduler logic 108 may transmit the demultiplexed packets to the HIP 110 at different times regardless of when the scheduler logic 108 receives the demultiplexed packets from the MACsec logic 106. For instance, the deterministic latency may vary based on a priority of each packet (e.g., of each port of the MACsec logic 106 communicating the packet), a content of each packet, the target recipient 104 to receive each packet, and the like.

In either embodiment in which multiple packets are transmitted in parallel, the PTP logic 102 may also account for additional durations of time used to process the packet, such as to multiplex the packets and/or to demultiplex the packets, to generate the timestamp. For instance, the latency associated with the embodiment of the integrated circuit 12 illustrated in FIG. 4 in which multiple packets are multiplexed and demultiplexed may be greater than the deterministic latency associated with the embodiment of the integrated circuit 12 illustrated in FIG. 3 in which packets are not multiplexed and demultiplexed. For this reason, the threshold duration of time for the embodiment illustrated in FIG. 4 may be greater than the threshold duration of time for the embodiment illustrated in FIG. 3 to accommodate the multiplex and demultiplex processes.

Furthermore, in some embodiments, a respective counter may be used to provide the respective elapsed time for each separate packet. That is, a first counter may be used to provide the elapsed time for a first packet, a second counter may be used to provide the elapsed time for a second packet, and the first counter and the second counter may operate independently of one another to provide the elapsed times. Indeed, a separate counter may be used for each corresponding port of the multiplexer interface 150 and the demultiplexer interface 152 to provide the elapsed time for the respective packets communicated via the ports. Each counter may provide the respective elapsed time associated with the packets to the MACsec logic 106 and the scheduler logic 108 to enable the MACsec logic 106 to provide the updated metadata for each packet and to enable the scheduler logic 108 to hold the respective packets for a suitable amount of time, respectively.

Figure 5:
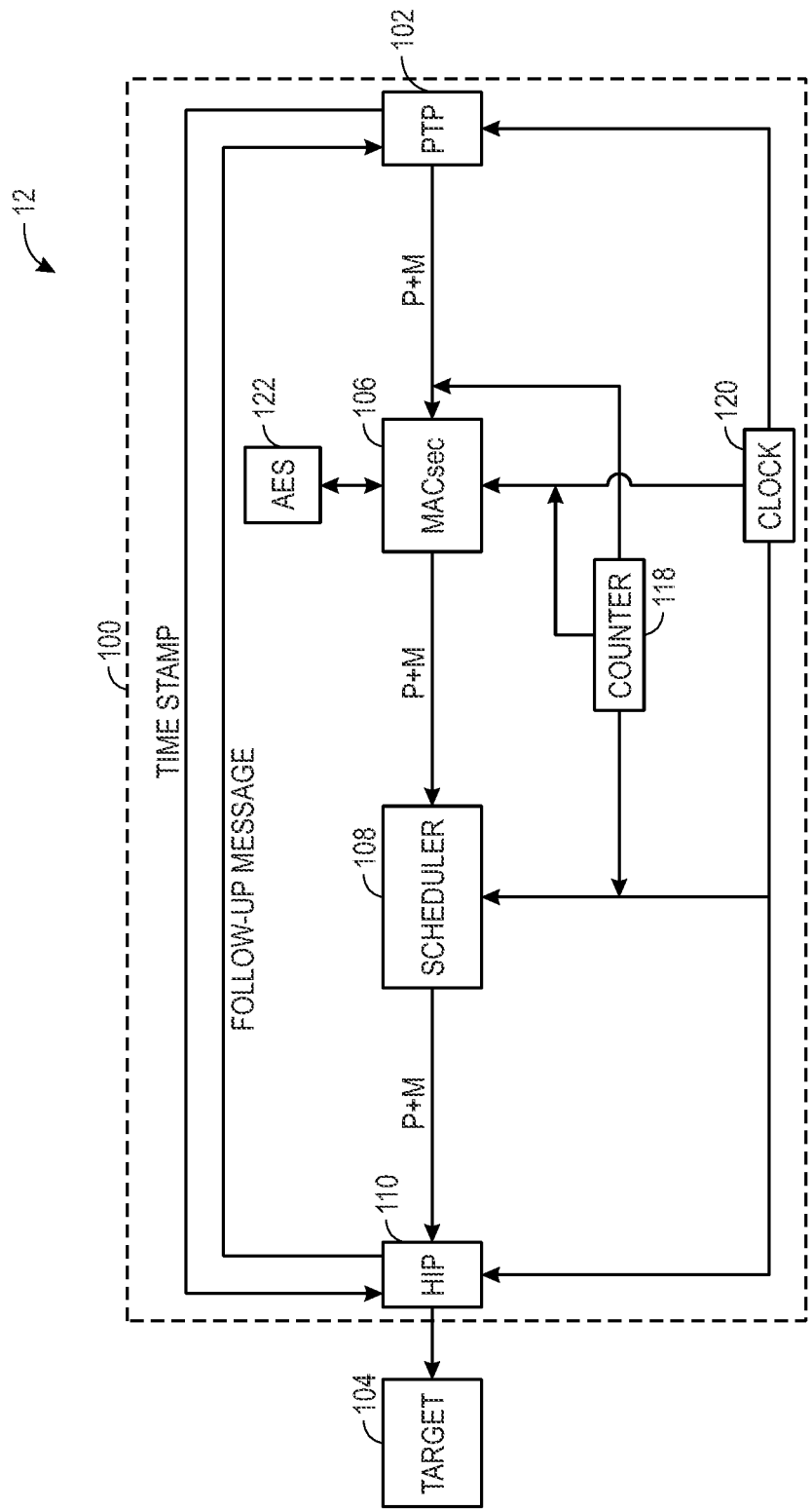
FIG. 5 is a diagram of circuitry that may be employed in the programmable fabric of FIG. 1 to transmit data, in accordance with an embodiment.

FIG. 5 is a block diagram of an embodiment of the system 100 that may be employed by the integrated circuit 12. The illustrated system 100 may operate in two-step operation mode of PTP. During the two-step operation mode of PTP, the PTP logic 102 may transmit the packet and its corresponding metadata to the MACsec logic 106 without the timestamp indicative of when the integrated circuit 12 transmits the packet. Thus, the MACsec logic 106 may not encrypt a timestamp during the two-step operation mode of PTP. However, the process during the two-step operation mode of PTP may generally be similar to that during the one-step operation mode of PTP. For example, the MACsec logic 106 may encrypt the packet and update the metadata received from the PTP logic 102. The scheduler logic 108 may receive the encrypted packet and the updated metadata from the MACsec logic 106 and hold the encrypted packet until a threshold duration of time has been reached based on the updated metadata and the elapsed time provided by the counter 118. The scheduler logic 108 may then transmit the encrypted packet to the HIP 110 for transmission to the target recipient 104.

During the two-step operation mode of PTP, upon receipt of the encrypted packet from the scheduler logic 108, the HIP 110 may transmit a follow-up message to the PTP logic 102. Upon receipt of the follow-up message from the HIP 110, the PTP logic 102 may transmit the timestamp indicative of when the integrated circuit 12 transmits the packet. For example, the PTP logic 102 may transmit a follow-up packet that includes the timestamp, and the HIP 110 may receive the timestamp from the PTP logic 102 and transmit the timestamp to the target recipient 104 upon receipt of the follow-up packet from the PTP logic 102. The follow-up message transmitted by the HIP 110 to the PTP logic 102 may directly indicate when the integrated circuit 12 (e.g., the HIP 110) transmits the packet. That is, the follow-up message may already account for the latency (e.g., an actual latency) associated with processing the packet from the PTP logic 102 to the HIP 110. Thus, the PTP logic 102 may transmit the timestamp based on the follow-up message instead of based on, for example, a predicted latency (e.g., the deterministic latency effectuated by the scheduler logic 108) associated with processing the packet from the PTP logic 102 to the HIP 110 in order to accurately represent when the integrated circuit 12 transmits the packet.

For the two-step operation mode of PTP, the scheduler logic 108 may similarly operate to implement a deterministic latency for different packets being transmitted. That is, each packet transmitted by the PTP logic 102 during the two-step operation mode of PTP may be associated with the same latency for processing the packet from the PTP logic 102 to the HIP 110. For example, the deterministic latency associated with the two-step operation mode of PTP may be approximately equal to the deterministic latency associated with the one-step operation mode of PTP.

Figure 6:
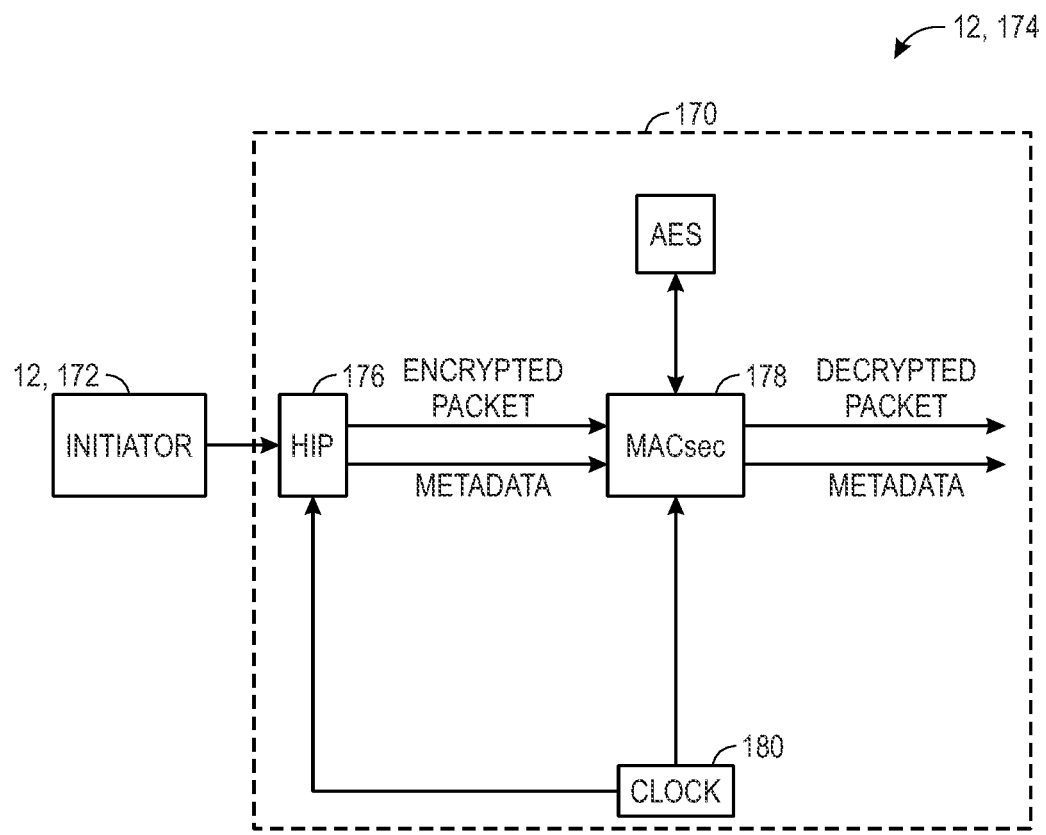
FIG. 6 is a diagram of circuitry that may be employed in the programmable fabric of FIG. 1 to receive data, in accordance with an embodiment.

FIG. 6 is a block diagram of an embodiment of a system 170 that may receive an encrypted packet from an initiator 172. As an example, the system 170 may be employed by the integrated circuit 12 and/or the target 104, which may receive the encrypted packet from a different initiator (e.g., a separate integrated circuit). As another example, the system 170 may be employed by an integrated circuit 174 that is separate from the integrated circuit 12, and the integrated circuit 174 may receive the encrypted packet from the integrated circuit 12 serving as the initiator 172. The system 170 may include an HIP 176 that may receive the encrypted packet and its accompanying metadata from the initiator 172. Upon receipt of the encrypted packet and the metadata, the HIP 176 may transmit the encrypted packet and the metadata to MACsec logic 178, which may decrypt or decode the encrypted packet and/or the metadata. For instance, the MACsec logic 178 may use a corresponding SAK, which may be a copy of the SAK used by the corresponding MACsec logic of the initiator 172, to decrypt the encrypted packet and/or the metadata. The MACsec logic 178 may then transmit the decrypted packet and/or the metadata for further processing by the integrated circuit 174 that contains the system 170. By way of example, the metadata may include a timestamp (e.g., an ingress timestamp) that may be used by the integrated circuit 174 to synchronize clocks with the initiator 172. For instance, each of the HIP 176 and the MACsec logic 178 may reference the same clock 180 (e.g., a client clock). Based on the timestamp included in the received metadata, the clock 180 may be adjusted to synchronize with the clock (e.g., a primary clock) of the initiator 172 in order to synchronize operation with the initiator 172.

The illustrated system 170 does not include scheduler logic. Thus, upon receipt of the packet and the metadata from the initiator 172, the packet and the metadata may be directly transmitted through the system 170 without being held (e.g., for a threshold duration of time). However, in additional or alternative embodiments, the system 170 may include scheduler logic that may hold the packet and/or the metadata so as to implement a deterministic latency during ingress of data.

Figure 7:
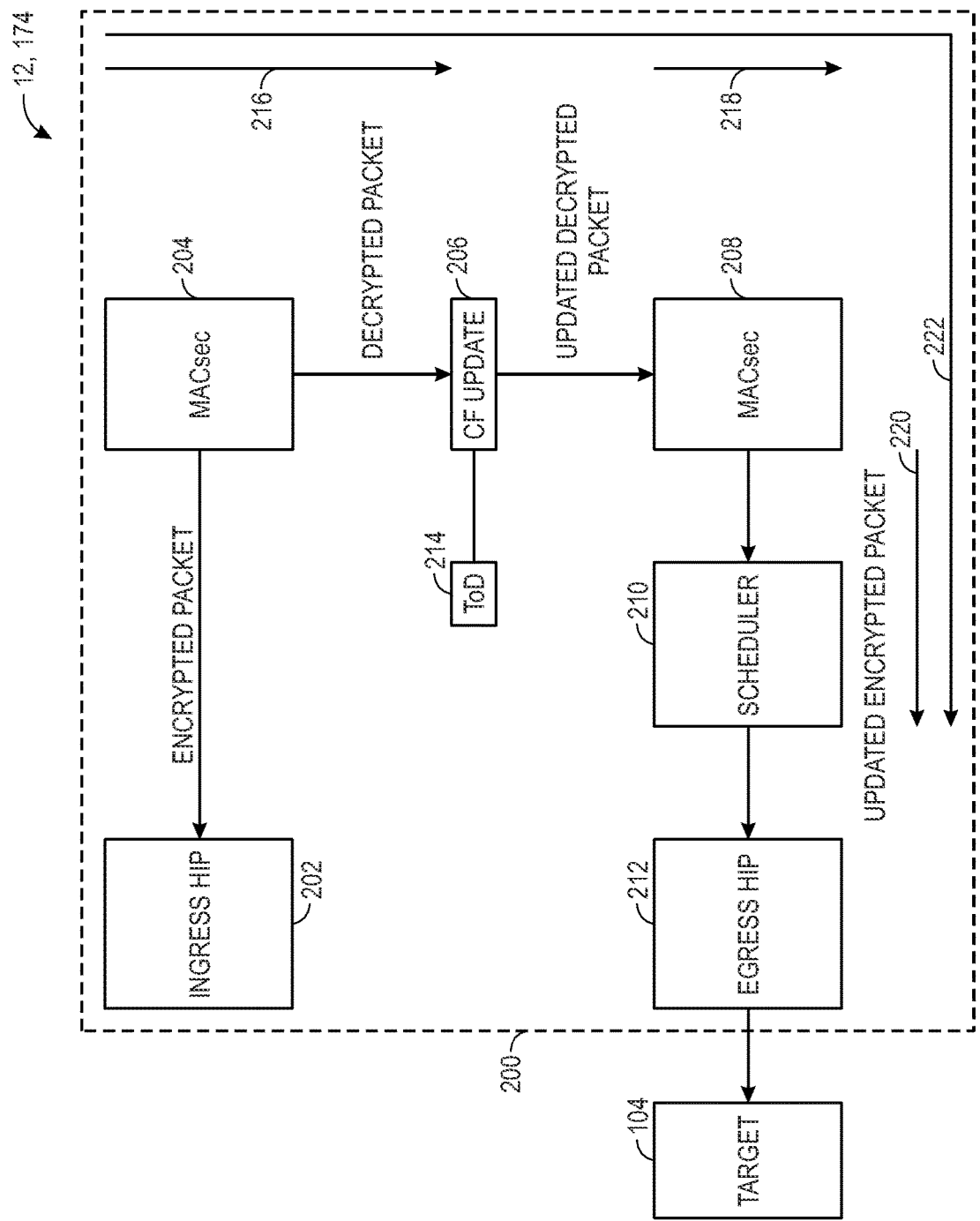
FIG. 7 is a diagram of circuitry that may be employed in the programmable fabric of FIG. 1 to receive and transmit data, in accordance with an embodiment.

FIG. 7 is a block diagram of an embodiment of a system 200 that may be employed by any of the integral circuits 12, 174 described herein. The system 200 may perform both MACsec encryption or encoding and MACsec decryption or decoding processes on a packet being transmitted to the target recipient 104. For example, the system 200 may include an ingress HIP 202 (e.g., ingress MAC logic, ingress PCS logic, ingress PMA logic) that may initially receive the encrypted packet, such as from an initiator. The system 200 may also include MACsec decryption logic or circuitry 204 that may receive the encrypted packet from the ingress HIP 202. The MACsec decryption logic 204 may decrypt or decode the encrypted packet upon receipt of the encrypted packet from the ingress HIP 202. Correction field (CF) update logic or circuitry 206 of the system 200 may receive the decrypted packet and update a CF of the decrypted packet. For example, the CF update logic 206 may update certain information contained within the packet to enable the target recipient 104 to receive more accurate data (e.g., data updated since transmission by the initiator to the system 200).

The system 200 may also include MACsec encryption logic or circuitry 208 that may encrypt the packet updated via the CF update logic 206. Scheduler logic 210 may receive the updated encrypted packet from the MACsec encryption logic 208 and hold the updated encrypted packet until a threshold duration of time has elapsed. After the threshold duration of time has elapsed, the scheduler logic 210 may transmit the updated encrypted packet to egress HIP 212 for further processing and transmission to the target recipient 104.

In some embodiments, the CF update logic 206 may update a timestamp associated with the packet. For example, the packet received from the initiator may be associated with a timestamp that was previously added by the initiator without factoring in latency associated with processing of the packet via the system 200. That is, a current timestamp associated with the decrypted packet may not be updated to indicate a time in which the system 200 (e.g., the integrated circuit 12, 174 in which the system 200 is incorporated) transmits the packet to the target recipient 104. The CF update logic 206 may update the timestamp based on the latency associated with processing the packet via the system 200. For instance, the CF update logic 206 may predict or consider latency introduced by operation of the MACsec decryption logic 204 to decrypt the encrypted packet as well as the MACsec encryption logic 208 to encrypt the updated packet. The CF update logic 206 may then update the timestamp based on the predicted latency, a previous timestamp included in the packet, and a clock (e.g., a ToD clock) 214 referenced by the CF update logic 206.

In such embodiments, a first duration of time 216 associated with the decryption operation performed by the MACsec decryption logic 204 may be variable, and a second duration of time 218 associated with the encryption operation performed by the MACsec encryption logic 208 may also be variable. For this reason, the scheduler logic 210 may hold the updated encrypted packet received from the MACsec encryption logic 208 for a third duration of time 220 to fix a total or summation 222 of the first duration of time 216, the second duration of time 218, and the third duration of time 220. For example, the scheduler logic 210 may hold the updated encrypted packet until the total 222 matches a threshold duration of time before the scheduler logic 210 transmits the updated encrypted packet to the egress HIP 212. The threshold duration of time may be set to at or above a maximum total or summation of the first duration of time 216 and the second duration of time 218 to accommodate any possible first duration of time 216 and second duration of time 218. In some embodiments, the first duration of time 216 and the second duration of time 218 may be approximately equal to one another. However, in additional or alternative embodiments, the first duration of time 216 and the second duration of time 218 may be substantially different from one another.

As an example, the MACsec decryption logic 204 may update metadata corresponding to the packet to indicate an elapsed time (e.g., a cycle value) in which the encrypted packet is received. The scheduler logic 210 may refer to the elapsed time indicated by the updated metadata (e.g., corresponding to when the MACsec decryption logic 204 received the encrypted packet) and a current elapsed time (e.g., an elapsed time received from a counter) to determine the total 222 duration of time. In response to the determined total 222 duration of time matching the threshold duration of time, the scheduler logic 210 may transmit the updated encrypted packet.

In an example embodiment in which the threshold duration of time is 150 cycles, for a first duration of time 216 equal to 50 cycles and a second duration of time 218 equal to 50 cycles, the scheduler logic 210 may hold the updated encrypted packet for a third duration of time 220 equal to 50 cycles. In another example embodiment in which the threshold duration of time is 150 cycles, for a first duration of time 216 equal to 70 cycles and a second duration of time 218 equal to 40 cycles, the scheduler logic 210 may hold the updated encrypted packet for a third duration of time 220 equal to 40 cycles. As such, the scheduler logic 210 may effectuate deterministic latency associated with processing each packet via the MACsec decryption logic 204, the CF update logic 206, the MACsec encryption logic 208, and the scheduler logic 210. Thus, the CF update logic 206 may more easily predict the timestamp in which the system 200 (e.g., the egress HIP 212) transmits the updated encrypted packet to the target recipient 104, and the CF update logic 206 may update the packet more accurately based on the timestamp.

Figure 8:
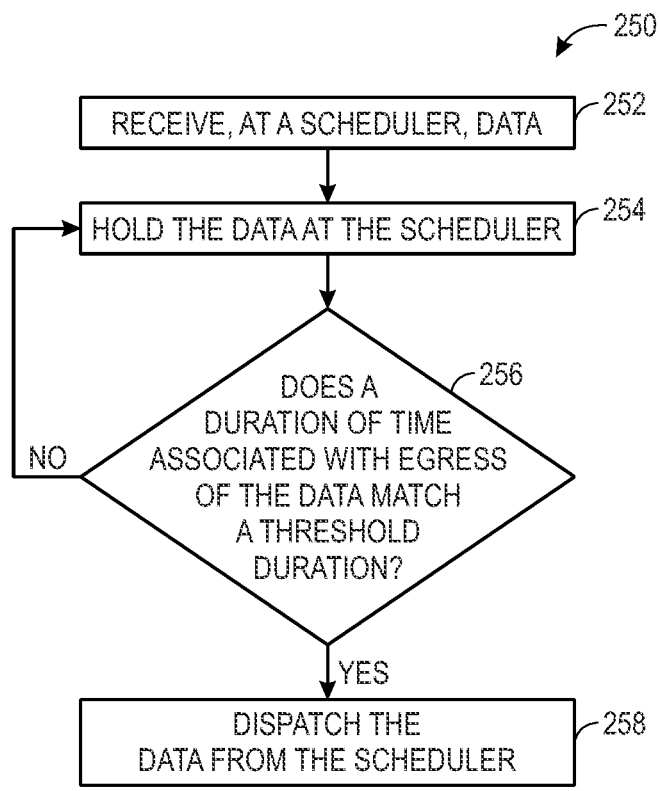
FIG. 8 is a flowchart of a process for transmitting data via scheduler logic that may be employed in the programmable fabric of FIG. 1 to transmit data, in accordance with an embodiment.

FIG. 8 is a flowchart of an embodiment of a process 250 for communicating data. In some embodiments, the respective methods and/or one or more of the procedures thereof may be performed by a single respective component or system, such as by scheduler logic (e.g., the scheduler logic 108, the scheduler logic 210) of an integrated circuit (e.g., the integrated circuit 12, the integrated circuit 174). In additional or alternative embodiments, multiple components or systems may perform the procedures of the process 250. It should also be noted that additional procedures may be performed with respect to the depicted process 250. Moreover, certain procedures of the process 250 may be removed, modified, and/or performed in a different order.

At block 252, the scheduler logic may receive data, which may include a packet and accompanying metadata. For example, the scheduler logic may receive the packet and the metadata from MACsec logic, such as the MACsec logic 106 and/or the MACsec encryption logic 208. In this way, the packet and at least a portion of the metadata received by the scheduler logic may be encrypted.

At block 254, the scheduler logic may hold the packet and the metadata. While the scheduler logic holds the packet and the metadata, the scheduler logic may monitor a duration of time associated with egress of the packet as indicated by the metadata. The duration of time may include, for example, the total 117 of the first duration of time 112 and the second duration of time 114 described with respect to FIGS. 3 and 4 and representing a duration of time since receipt of the unencrypted packet at the MACsec logic 106. That is, the total 117 duration of time may encompass respective durations of time associated with an encryption process performed by the MACsec logic and holding of the packet and the metadata at the scheduler logic. Additionally or alternatively, the duration of time may include the total 222 of the first duration of time 216, the second duration of time 218, and the third duration of time 220 described with respect to FIG. 7 and representing a duration of time since receipt of the encrypted packet at the MACsec decryption logic 204. In this manner, the total 222 duration of time may include respective durations of time associated with a decryption process performed by MACsec decryption logic, an encryption process performed by MACsec encryption logic, and holding of the packet and the metadata at the scheduler logic. In either embodiment, as the scheduler logic continues to hold the packet and the metadata, the duration of time associated with egress of the packet may increase.

Furthermore, in either embodiment, the scheduler logic may receive elapsed time information from a counter, such as the counter 118, and determine the duration of time associated with egress of the packet based on the elapsed time information. At block 256, the scheduler logic may compare the duration of time associated with egress of the packet to a threshold duration of time. The threshold duration of time may be a fixed duration regardless of the packet and/or the metadata received and held by the scheduler logic. In other words, for each packet and/or the metadata, the scheduler logic may compare the corresponding duration of time with the same threshold duration of time.

The scheduler may continue to hold the packet and the metadata in response to a determination that the duration of time associated with egress does not match the threshold duration of time. For example, a mismatch between the duration of time and the threshold duration of time may indicate that the scheduler logic has not yet held the packet and the metadata for a sufficient duration of time, and the scheduler may therefore continue to hold the packet and the metadata. However, in response to a determination that that the duration of time associated with egress matches the threshold duration of time, the scheduler may dispatch or transmit the packet and the metadata, as described in block 258. For instance, a match between the duration of time and the threshold duration of time may indicate that the scheduler logic has held the packet and the metadata for a sufficient duration of time. As an example, the packet and/or the metadata may be associated with a determined or predicted timestamp (e.g., a timestamp previously inserted via the PTP logic 102) indicative of when the integrated circuit transmits the packet and/or the metadata. By holding the packet and the metadata until the duration of time associated with egress matches the threshold duration of time, the scheduler logic may enable the integrated circuit to transmit the packet and the metadata at the determined timestamp. Indeed, the scheduler logic may dispatch the packet and the metadata to HIP (e.g., the HIP 110, the egress HIP 212) when the threshold duration of time is reached, and the HIP may transmit the packet and the metadata from the integrated circuit to a target recipient (e.g., the target recipient 104).

In certain embodiments, the counter and/or the metadata may indicate an elapsed time using cycle values. For example, the counter may iteratively provide a cycle number to the MACsec logic and the scheduler logic. Upon receipt of the packet and the metadata (e.g., from the PTP logic 102), the MACsec logic may update the metadata to indicate the cycle value or number received from the count upon receipt of the packet and the metadata. The scheduler logic may receive the packet and the updated metadata from the MACsec logic and may refer to the cycle value included in the updated metadata as well as the cycle value iteratively provided by the counter. The scheduler logic may determine the duration of time associated with egress of the packet and the metadata based on a difference between the cycle value (e.g., a current cycle number) received from the counter and the cycle value included in the metadata. In response to the difference between the cycle values matching a threshold cycle value, the scheduler logic may transmit the packet and the metadata.

In an example embodiment, the MACsec logic may receive the packet and the metadata when the counter provides a cycle value of 20 to the MACsec logic. As such, the MACsec logic may update the metadata to indicate receipt of the packet and the metadata at a cycle value of 20. After performing the encryption process, the MACsec logic may transmit the packet and the metadata to the scheduler logic. The scheduler logic may receive the packet and the metadata from the MACsec logic when the counter provides a cycle value of 70 (e.g., indicating that approximately 50 cycles elapsed during the encryption process). The threshold duration may be equal to 100 cycles. For this reason, the scheduler logic may continue to hold the packet and the metadata until the cycle value received from the counter at the scheduler logic is equal to 100 cycles greater than the cycle value of 20, or 120 cycles. Upon receiving the cycle value of 120, the scheduler logic may dispatch the packet and the metadata.

Figure 9:
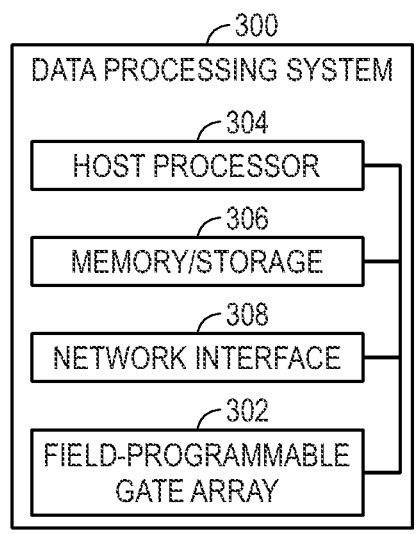
FIG. 9 is a block diagram of a data processing system including a processor with an integrated programmable fabric unit, in accordance with an embodiment.

Bearing the foregoing in mind, a processor may be integrated into a data processing system or may be a component included in a data processing system, such as a data processing system 300, shown in FIG. 9. The data processing system 300 may include a host processor 304, memory and/or storage circuitry 306, and a network interface 308. The data processing system 300 may include more or fewer components (e.g., electronic display, user interface structures, ASICs). The host processor 304 may include any of the foregoing processors that may manage a data processing request for the data processing system 300 (e.g., to perform encryption, decryption, machine learning, video processing, voice recognition, image recognition, data compression, database search ranking, bioinformatics, network security pattern identification, spatial navigation, cryptocurrency operations). The memory and/or storage circuitry 306 may include random access memory (RAM), read-only memory (ROM), one or more hard drives, flash memory, or the like. The memory and/or storage circuitry 306 may hold data to be processed by the data processing system 300. In some cases, the memory and/or storage circuitry 306 may also store configuration programs (bitstreams) for programming an FPGA 302. The network interface 308 may allow the data processing system 300 to communicate with other electronic devices. The data processing system 300 may include several different packages or may be contained within a single package on a single package substrate. For example, components of the data processing system 300 may be located on several different packages at one location (e.g., a data center) or multiple locations. For instance, components of the data processing system 300 may be located in separate geographic locations or areas, such as cities, states, or countries.

In one example, the data processing system 300 may be part of a data center that processes a variety of different requests. For instance, the data processing system 300 may receive a data processing request via the network interface 308 to perform encryption, decryption, machine learning, video processing, voice recognition, image recognition, data compression, database search ranking, bioinformatics, network security pattern identification, spatial navigation, digital signal processing, or some other specialized task.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. An integrated circuit device, comprising: encryption circuitry to encrypt a data packet; and scheduler circuitry to receive the encrypted data packet from the encryption circuitry, wherein the scheduler circuitry: monitors a duration of time associated with egress of the encrypted data packet; holds the encrypted data packet until the duration of time matches a threshold duration of time; and transmits the encrypted data packet in response to the duration of time matching the threshold duration of time.

EXAMPLE EMBODIMENT 2. The integrated circuit device of example embodiment 1, wherein the duration of time comprises a duration of time elapsed since receipt of the data packet by the encryption circuitry.

EXAMPLE EMBODIMENT 3. The integrated circuit device of example embodiment 1, comprising a counter, wherein the counter provides an elapsed time to the scheduler circuitry, and the scheduler circuitry monitors the duration of time associated with egress of the encrypted data packet based on the elapsed time provided by the counter.

EXAMPLE EMBODIMENT 4. The integrated circuit device of example embodiment 3, wherein the encryption circuitry indicates an initial elapsed time upon receipt of the data packet, and the scheduler circuitry determines the duration of time associated with egress of the encrypted data packet based on a difference between the initial elapsed time indicated by the encryption circuitry and the elapsed time provided by the counter to the scheduler circuitry.

EXAMPLE EMBODIMENT 5. The integrated circuit device of example embodiment 1, comprising decryption circuitry to decrypt the data packet prior to encryption of the data packet via the encryption circuitry, wherein the duration of time comprises a duration of time elapsed since receipt of the data packet by the decryption circuitry.

EXAMPLE EMBODIMENT 6. The integrated circuit device of example embodiment 5, comprising correction field update circuitry to: receive the decrypted data packet decrypted by the decryption circuitry; update a correction field of the decrypted data packet; and transmit the decrypted data packet to the encryption circuitry after updating the correction field of the decrypted data packet.

EXAMPLE EMBODIMENT 7. The integrated circuit device of example embodiment 1, comprising processing cores, wherein the scheduler circuitry transmits the encrypted data packet to the processing cores in response to the duration of time matching the threshold duration of time.

EXAMPLE EMBODIMENT 8. The integrated circuit device of example embodiment 7, wherein the processing cores transmit the encrypted data packet from the integrated circuit device to a target recipient device.

EXAMPLE EMBODIMENT 9. An integrated circuit device, comprising: encryption circuitry configurable to encrypt data via an encryption process, wherein the encryption process occurs during a first duration of time; and scheduler circuitry configurable to receive the encrypted data from the encryption circuitry, wherein the scheduler circuitry is configurable to: hold the encrypted data for a second duration of time; and transmit the encrypted data in response to the second duration of time indicating that a total duration of time since receipt of the data at the encryption circuitry matches a threshold duration of time, wherein the total duration of time comprises a sum of the first duration of time and the second duration of time.

EXAMPLE EMBODIMENT 10. The integrated circuit device of example embodiment 9, wherein the encryption circuitry is configurable to update metadata associated with the encrypted data to indicate a first time in which the data is received by the encryption circuitry, and the scheduler circuitry is configurable to determine the total duration of time since receipt of the data at the encryption circuitry based on a difference between the first time in which the encryption circuitry receives the data and a second time received from a counter while holding the encrypted data.

EXAMPLE EMBODIMENT 11. The integrated circuit device of example embodiment 9, wherein the encryption circuitry comprises media access control security encryption circuitry.

EXAMPLE EMBODIMENT 12. The integrated circuit device of example embodiment 9, comprising precision time protocol circuitry configurable to transmit the data to the encryption circuitry, wherein the precision time protocol circuitry is configurable to transmit a timestamp based on the threshold duration of time, and the timestamp is indicative of a time of transmission of the encrypted data via the integrated circuit device EXAMPLE EMBODIMENT 13. The integrated circuit device of example embodiment 12, comprising processing cores configurable to: receive the encrypted data transmitted by the scheduler circuitry; transmit a follow-up message to the precision time protocol circuitry upon receipt of the encrypted data from the scheduler circuitry; and transmit the encrypted data from the integrated circuit device to a target recipient device.

EXAMPLE EMBODIMENT 14. The integrated circuit device of example embodiment 13, wherein the precision time protocol circuitry is configurable to transmit the timestamp to the processing cores based on the follow-up message.

EXAMPLE EMBODIMENT 15. An integrated circuit device, comprising: precision time protocol circuitry configured to transmit a packet and corresponding metadata; encryption circuitry configured to: receive the packet and the corresponding metadata from the precision time protocol circuitry; update the corresponding metadata to indicate a time of receipt of the packet at the encryption circuitry from the precision time protocol circuitry; and encrypt the packet; and scheduler circuitry configured to: receive the encrypted packet and updated corresponding metadata from the encryption circuitry; and hold the encrypted packet and the updated corresponding metadata for a duration of time based on the time of receipt of the encrypted packet at the encryption circuitry indicated by the updated corresponding metadata.

EXAMPLE EMBODIMENT 16. The integrated circuit device of example embodiment 15, wherein the scheduler circuitry is configured to transmit the encrypted packet in response to determining that the duration of time indicates that a total duration of time since receipt of the packet at the encryption circuitry matches a threshold duration of time.

EXAMPLE EMBODIMENT 17. The integrated circuit device of example embodiment 16, wherein the total duration of time comprises the duration of time in which the scheduler circuitry holds the encrypted packet and the updated corresponding metadata and an additional duration of time in which the encryption circuitry encrypts the packet, the additional duration of time is variable, and the duration of time and the additional duration of time are inversely proportional to one another.

EXAMPLE EMBODIMENT 18. The integrated circuit device of example embodiment 15, wherein the precision time protocol circuitry is configured to transmit an additional packet and corresponding additional metadata in parallel with the packet and the corresponding metadata, and the encryption circuitry is configured to encrypt the additional packet and comprises: a multiplexer configured to select between the packet with the corresponding metadata and the additional packet with the corresponding additional metadata for encryption in the encryption circuitry; and a demultiplexer configured to route the encrypted packet with the corresponding metadata down a first path and to route the encrypted additional packet with the corresponding additional metadata down a second path.

EXAMPLE EMBODIMENT 19. The integrated circuit device of example embodiment 18, wherein the scheduler circuitry is configured to: monitor a first duration of time elapsed since receipt of the packet at the encryption circuitry and a second duration of time elapsed since receipt of the additional packet at the encryption circuitry; transmit the encrypted packet in response to determining that the first duration of time matches a first threshold duration of time; and transmit the encrypted additional packet in response to determining that the second duration of time matches a second threshold duration of time.

EXAMPLE EMBODIMENT 20. The integrated circuit device of example embodiment 15, wherein the precision time protocol circuitry is configured to transmit the packet and the corresponding metadata during performance of precision time protocol, and the precision time protocol comprises a one-step operation mode or a two-step operation mode.

What is claimed is:

1. An integrated circuit device, comprising:
a counter, wherein the counter provides an elapsed time to scheduler circuitry;
encryption circuitry to encrypt a data packet, wherein the encryption circuitry indicates an initial elapsed time upon receipt of the data packet; and
the scheduler circuitry to receive the encrypted data packet from the encryption circuitry, wherein the scheduler circuitry:
monitors a duration of time associated with egress of the encrypted data packet, wherein the scheduler circuitry determines the duration of time associated with egress of the encrypted data packet based on a difference between the initial elapsed time indicated by the encryption circuitry and the elapsed time provided by the counter;
holds the encrypted data packet until the duration of time matches a threshold duration of time; and
transmits the encrypted data packet in response to the duration of time matching the threshold duration of time.

2. The integrated circuit device of claim 1, wherein the duration of time comprises a duration of time elapsed since receipt of the data packet by the encryption circuitry.

3. The integrated circuit device of claim 1, comprising:
ingress circuitry configured to receive a previously encrypted data packet;
decryption circuitry to decrypt the previously encrypted data packet to form the data packet prior to encryption of the data packet via the encryption circuitry, wherein the duration of time comprises a duration of time elapsed since receipt of the data packet by the decryption circuitry.

4. The integrated circuit device of claim 3, comprising correction field update circuitry to:
receive the decrypted data packet decrypted by the decryption circuitry;
update a correction field of the decrypted data packet; and
transmit the decrypted data packet to the encryption circuitry after updating the correction field of the decrypted data packet.

5. The integrated circuit device of claim 1, comprising processing cores, wherein the scheduler circuitry transmits the encrypted data packet to the processing cores in response to the duration of time matching the threshold duration of time.

6. The integrated circuit device of claim 5, wherein the processing cores transmit the encrypted data packet from the integrated circuit device to a target recipient device.

7. The integrated circuit device of claim 1, wherein the encryption circuitry comprises media access control security encryption circuitry.

8. An integrated circuit device, comprising:
encryption circuitry configurable to:
encrypt data via an encryption process, wherein the encryption process occurs during a first duration of time; and
update metadata associated with the encrypted data to indicate a first time in which the data is received by the encryption circuitry; and
scheduler circuitry configurable to receive the encrypted data from the encryption circuitry, wherein the scheduler circuitry is configurable to:
hold the encrypted data for a second duration of time; and
determine a total duration of time since receipt of the data at the encryption circuitry based on a difference between the first time in which the encryption circuitry receives the data and a second time received from a counter while holding the encrypted data;
transmit the encrypted data in response to the second duration of time indicating that the total duration of time since receipt of the data at the encryption circuitry matches a threshold duration of time, wherein the total duration of time comprises a sum of the first duration of time and the second duration of time.

9. The integrated circuit device of claim 8, wherein the encryption circuitry comprises media access control security encryption circuitry.

10. The integrated circuit device of claim 8, comprising precision time protocol circuitry configurable to transmit the data to the encryption circuitry, wherein the precision time protocol circuitry is configurable to transmit a timestamp based on the threshold duration of time, and the timestamp is indicative of a time of transmission of the encrypted data via the integrated circuit device.

11. The integrated circuit device of claim 10, comprising processing cores configurable to:
  receive the encrypted data transmitted by the scheduler circuitry;
  transmit a follow-up message to the precision time protocol circuitry upon receipt of the encrypted data from the scheduler circuitry; and
  transmit the encrypted data from the integrated circuit device to a target recipient device.

12. The integrated circuit device of claim 11, wherein the precision time protocol circuitry is configurable to transmit the timestamp to the processing cores based on the follow-up message.

13. An integrated circuit device, comprising:
  precision time protocol circuitry configured to transmit a packet and corresponding metadata;
  encryption circuitry configured to:
    receive the packet and the corresponding metadata from the precision time protocol circuitry;
    update the corresponding metadata to indicate a time of receipt of the packet at the encryption circuitry from the precision time protocol circuitry; and
    encrypt the packet; and
  scheduler circuitry configured to:
    receive the encrypted packet and updated corresponding metadata from the encryption circuitry;
    hold the encrypted packet and the updated corresponding metadata for a duration of time based on the time of receipt of the encrypted packet at the encryption circuitry indicated by the updated corresponding metadata; and
    transmit the encrypted packet in response to determining that the duration of time indicates that a total duration of time since receipt of the packet at the encryption circuitry matches a threshold duration of time, wherein the total duration of time comprises the duration of time in which the scheduler circuitry holds the encrypted packet and the updated corresponding metadata and an additional duration of time in which the encryption circuitry encrypts the packet.

14. The integrated circuit device of claim 13, wherein the precision time protocol circuitry is configured to transmit an additional packet and corresponding additional metadata in parallel with the packet and the corresponding metadata, and the encryption circuitry is configured to encrypt the additional packet and comprises:
  a multiplexer configured to select between the packet with the corresponding metadata and the additional packet with the corresponding additional metadata for encryption in the encryption circuitry; and
  a demultiplexer configured to route the encrypted packet with the corresponding metadata down a first path and to route the encrypted additional packet with the corresponding additional metadata down a second path.

15. The integrated circuit device of claim 14, wherein the scheduler circuitry is configured to:
  monitor a first duration of time elapsed since receipt of the packet at the encryption circuitry and a second duration of time elapsed since receipt of the additional packet at the encryption circuitry;
  transmit the encrypted packet in response to determining that the first duration of time matches a first threshold duration of time; and
  transmit the encrypted additional packet in response to determining that the second duration of time matches a second threshold duration of time.

16. The integrated circuit device of claim 13, wherein the precision time protocol circuitry is configured to transmit the packet and the corresponding metadata during performance of precision time protocol, and the precision time protocol comprises a one-step operation mode or a two-step operation mode.

17. The integrated circuit device of claim 13, comprising a counter, wherein the counter provides an elapsed time to the scheduler circuitry, and the scheduler circuitry determines the total duration of time since receipt of the packet at the encryption circuitry based on the elapsed time provided by the counter.

18. The integrated circuit device of claim 17, wherein the scheduler circuitry determines the total duration of time since receipt of the packet at the encryption circuitry based on a difference between the initial elapsed time indicated by the encryption circuitry and the time of receipt of the encrypted packet at the encryption circuitry indicated by the updated corresponding metadata.

19. The integrated circuit device of claim 13, wherein the additional duration of time is variable.

20. The integrated circuit device of claim 19, wherein the duration of time and the additional duration of time are inversely proportional to one another.

* * * * *